(12) United States Patent
Koreltz et al.

(10) Patent No.: US 8,114,478 B1
(45) Date of Patent: Feb. 14, 2012

(54) DUAL-SIDED MEMBRANE SHEET AND METHOD FOR MAKING THE SAME

(75) Inventors: Michael S. Koreltz, Bloomington, MN (US); David J. Moll, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/884,839

(22) Filed: Sep. 17, 2010

(51) Int. Cl.
  *B05D 5/00* (2006.01)
(52) U.S. Cl. ............... 427/245; 427/244; 427/255.12
(58) Field of Classification Search .............. 427/96.6, 427/255.1; 264/901–905, 338, 900; 210/500.23
  See application file for complete search history.

(56) References Cited

U.S. PATENT DOCUMENTS

| | | | |
|---|---|---|---|
| 3,397,790 A | 8/1968 | Glen et al. | |
| 3,471,606 A * | 10/1969 | Corbett et al. ............ | 264/209.5 |
| 4,021,351 A | 5/1977 | Bray | |
| 4,277,344 A | 7/1981 | Cadotte | |
| 4,707,265 A * | 11/1987 | Barnes et al. ................ | 210/638 |
| 4,768,410 A | 9/1988 | Wood | |
| 4,834,884 A | 5/1989 | Bergloff et al. | |
| 4,944,877 A | 7/1990 | Maples | |
| 5,046,936 A | 9/1991 | Bourdiol et al. | |
| 5,089,187 A | 2/1992 | Aptel et al. | |
| 5,114,582 A | 5/1992 | Sandstrom et al. | |
| 5,171,493 A | 12/1992 | Aptel et al. | |
| 5,248,424 A | 9/1993 | Cote et al. | |
| 5,275,725 A | 1/1994 | Ishii et al. | |
| 5,340,008 A | 8/1994 | Freermann et al. | |
| 5,482,625 A | 1/1996 | Shimizu et al. | |
| 5,500,247 A | 3/1996 | Hagqvist | |
| 5,538,642 A | 7/1996 | Solie | |
| 5,620,605 A | 4/1997 | Moller | |
| 5,681,467 A | 10/1997 | Solie et al. | |
| 5,768,964 A | 6/1998 | Meschi | |
| 6,066,254 A | 5/2000 | Huschke et al. | |
| 6,090,441 A | 7/2000 | Vining, Jr. et al. | |
| 6,280,626 B1 | 8/2001 | Miyashita et al. | |
| 6,287,467 B1 | 9/2001 | Nagano et al. | |
| 6,299,772 B1 | 10/2001 | Huschke et al. | |

(Continued)

FOREIGN PATENT DOCUMENTS

FR 2445163 7/1980

(Continued)

OTHER PUBLICATIONS

Final MBR-Network Workshop, Salient outcomes of the European R&D projects on MBR technology, Mar. 31-Apr. 1, Berlin 2009 (Germany).

(Continued)

*Primary Examiner* — Timothy Meeks
*Assistant Examiner* — Irwin Bailey
(74) *Attorney, Agent, or Firm* — Edward W. Black

(57) ABSTRACT

A method for making dual-sided membrane sheet comprises the steps of: a) forming a microporous polymer sheet including a plurality of capillary channels and b) forming a semipermeable discriminating layer upon at least a portion of the opposing outer surfaces of the sheet, wherein the sheet is advanced along a production pathway during at least a portion of: step a), step b), or while transferring the sheet from step a) to step b) by engaging the sheet along one or more of its edge sections.

15 Claims, 4 Drawing Sheets

U.S. PATENT DOCUMENTS

| | | | |
|---|---|---|---|
| 6,381,846 B2 | 5/2002 | Insley et al. | |
| 6,406,626 B1 * | 6/2002 | Murakami et al. | 210/500.38 |
| 6,632,356 B2 | 10/2003 | Hallan et al. | |
| 6,776,940 B2 | 8/2004 | Meyering et al. | |
| 6,787,216 B1 * | 9/2004 | Koenhen | 428/188 |
| 6,878,278 B2 | 4/2005 | Mickols | |
| 6,881,336 B2 | 4/2005 | Johnson | |
| 6,994,789 B2 | 2/2006 | Sale et al. | |
| 7,048,855 B2 | 5/2006 | de la Cruz | |
| 7,279,215 B2 | 10/2007 | Hester et al. | |
| 7,311,831 B2 | 12/2007 | Bradford et al. | |
| 7,459,082 B2 | 12/2008 | Tung et al. | |
| 7,743,929 B2 | 6/2010 | Kools | |
| 2006/0053759 A1 | 3/2006 | Winters et al. | |
| 2006/0292044 A1 | 12/2006 | Ohno et al. | |
| 2007/0272628 A1 | 11/2007 | Mickols et al. | |
| 2007/0286949 A1 | 12/2007 | Doyen et al. | |
| 2008/0156730 A1 | 7/2008 | Heinen | |
| 2008/0164208 A1 | 7/2008 | Doyen et al. | |
| 2008/0185332 A1 | 8/2008 | Niu et al. | |
| 2008/0257817 A1 | 10/2008 | Kamleiter et al. | |
| 2008/0290031 A1 | 11/2008 | Popa et al. | |
| 2009/0011182 A1 * | 1/2009 | Mackley et al. | 428/119 |
| 2009/0071896 A1 | 3/2009 | Mues et al. | |
| 2009/0078644 A1 | 3/2009 | Mues et al. | |
| 2011/0049038 A1 * | 3/2011 | Aerts et al. | 210/321.75 |

FOREIGN PATENT DOCUMENTS

| | | |
|---|---|---|
| FR | 2616812 | 12/1988 |
| JP | 59082906 | 5/1984 |
| JP | H8-155275 | 6/1996 |
| JP | 1190192 | 4/1999 |
| JP | 11128692 | 5/1999 |
| JP | 2951189 | 9/1999 |
| JP | 2001205054 | 7/2001 |
| NL | 1009866 | 2/2000 |
| WO | 8102750 | 10/1981 |
| WO | 2006043884 | 4/2006 |
| WO | 2007036332 | 4/2007 |
| WO | 2009127345 | 10/2009 |

OTHER PUBLICATIONS

Grelot et al., Evaluation of a novel flat sheet MBR filtration system., Desalination 236 (2009) 111-119.

Grelot et al., A new and appropriate fibre sheet configuration for MBR technologies., Desalination and Water Treatment 6 (2009) 25-32.

Introduction to membranes—MBRs: Manufacturers' comparison: part 1, Filtration+Separation, Mar. 2008.

Introduction to membranes—MBRs: Manufacturers' comparison: part 2—supplier review, Filtration+Separation, Apr. 2008.

Introduction to membranes—MBRs: Manufacturers' comparison: part 3—supplier review, Filtration+Separation, May 2008.

Kubota MBR brochuree Aug. 2006.

Microdyn Biocel Brochure Apr. 2008.

Microdyn Nadir Brochure Apr. 2008.

Toray MBR Brochure Sep. 2006.

Yang et al., State-of-the-are of membrane bioreactors: Worldwide research and commercial applications in North America., Journal of Membrane Science 270 (2006) 201-211.

U.S. Appl. No. 12/858,805, Aerts, et al., Filtration Module Including Membrane Sheet With Capillary Channels, Aug. 18, 2010.

PCT/US10/040780, Billovits, et al., Spiral Wound Module Including Membrane Sheet With Capillary Channels, Jul. 1, 2010.

* cited by examiner

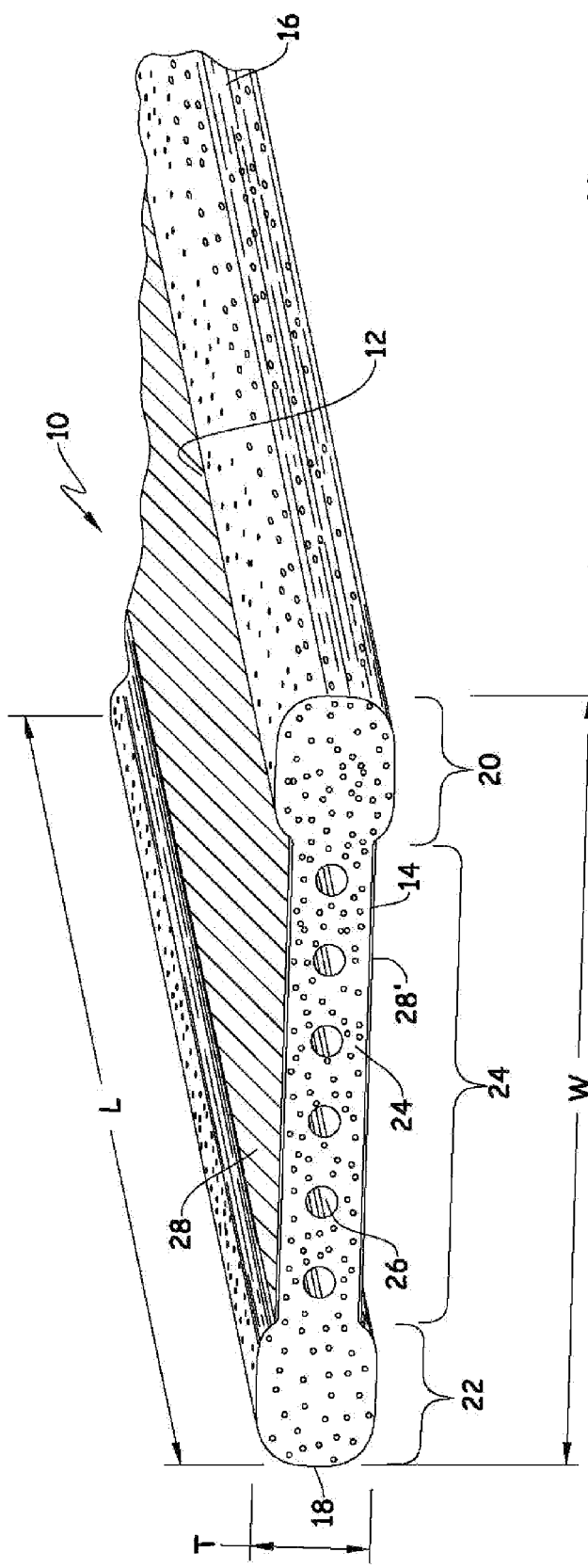
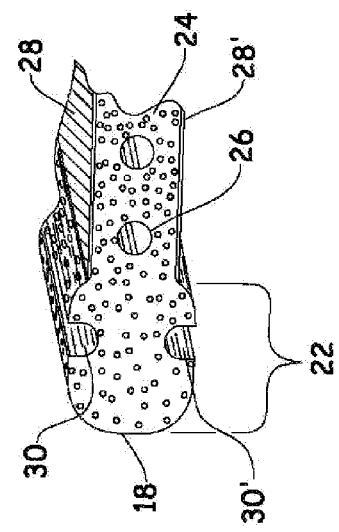

DUAL-SIDED MEMBRANE SHEET AND METHOD FOR MAKING THE SAME

TECHNICAL FIELD

The present invention is directed toward dual-sided membrane sheets along with methods for making and using the same.

BACKGROUND ART

Dual-sided membrane sheets comprise a planar configuration including two opposing outer surfaces surrounding an inner fluid flow pathway. One known embodiment includes an inner layer of a fibrous support material comprising a web or scrim of non-woven or woven fabric. These type of sheets are commonly referred to as "supported" membranes. Examples are described in U.S. Pat. No. 5,275,725; U.S. Pat. No. 7,048,855; US 2008/0164208; US 2008/0257817; US 2009/0071896 and US 2009/0078644. The inner layer of fibrous material is relatively strong and provides the sheet with support during membrane formation and may further serve as an inner fluid flow pathway. Processes for making continuous, supported, dual-sided membranes are described in US 2007/0286949, U.S. Pat. No. 6,776,940, and U.S. Pat. No. 6,090,441. In a typical embodiment a scrim of fibrous sheet material is pulled from a roll along a production pathway through a series of coating steps wherein layers of semipermeable membrane are formed within or upon the scrim. Once formed the resulting membrane sheet may be wound up into a roll or otherwise advanced by way of rollers that engage the outer surface(s) of the membrane sheet.

Another type of dual-sided membrane sheet comprises an integral extruded porous sheet including capillary channels which serve as an inner fluid flow pathway. This type of sheet is distinguishable from those previously described in that the sheet is "unsupported." That is, the membrane does not include a fibrous support material. Examples are described in U.S. Pat. No. 5,046,936; U.S. Pat. No. 5,089,187; U.S. Pat. No. 5,171,493 and US 2009/0011182. Such membrane sheets may be extruded from a variety of polymer mixtures, e.g. polyether sulfone, polysulfone and polyvinylidene fluoride. U.S. Pat. No. 6,787,216; FR 2616812; JP 59-082906 and JP 11-90192 describe the use of such membrane sheets within filtration modules.

U.S. Pat. No. 6,994,789 describes another embodiment of an unsupported multilayer membrane wherein multiple layers of a polymer mixture are coated upon a continuously moving non-porous release surface, e.g. a moving belt or rotating drum. After conducing a phase inversion, the resulting multilayer membrane sheet is removed from the non-porous release surface.

STATEMENT OF INVENTION

The invention includes a dual-sided membrane sheet along with methods for making and using the same. In one embodiment, the subject method comprises the steps of: a) forming a microporous polymer sheet including a plurality of capillary channels and b) forming a semi-permeable discriminating layer upon at least a portion of the opposing outer surfaces of the sheet, wherein the sheet is advanced along a production pathway during at least a portion of: step a), step b), or while transferring the sheet from step a) to step b), by engaging the sheet along one or more of its edge sections. Many additional embodiments are disclosed. Such dual-sided membrane sheets find utility in a wide variety of fluid separations and may be incorporated into a variety of modules including spiral wound modules such as those described in U.S. Ser. No. 12/858,805 and submerged modules as described in PCT/US10/040,780.

BRIEF DESCRIPTION OF THE FIGURES

The included figures illustrate several embodiments of the subject dual-sided membrane sheet. The Figures are not to scale and include idealized views to facilitate description. Where possible, like numerals have been used throughout the figures and written description to designate the same or similar features.

FIG. 1 is a perspective, partially cut-away view of one embodiment of a dual-sided membrane sheet.

FIG. 2 is a perspective, partially cut-away view of another embodiment of a dual-sided membrane sheet.

DETAILED DESCRIPTION

Figure 3:
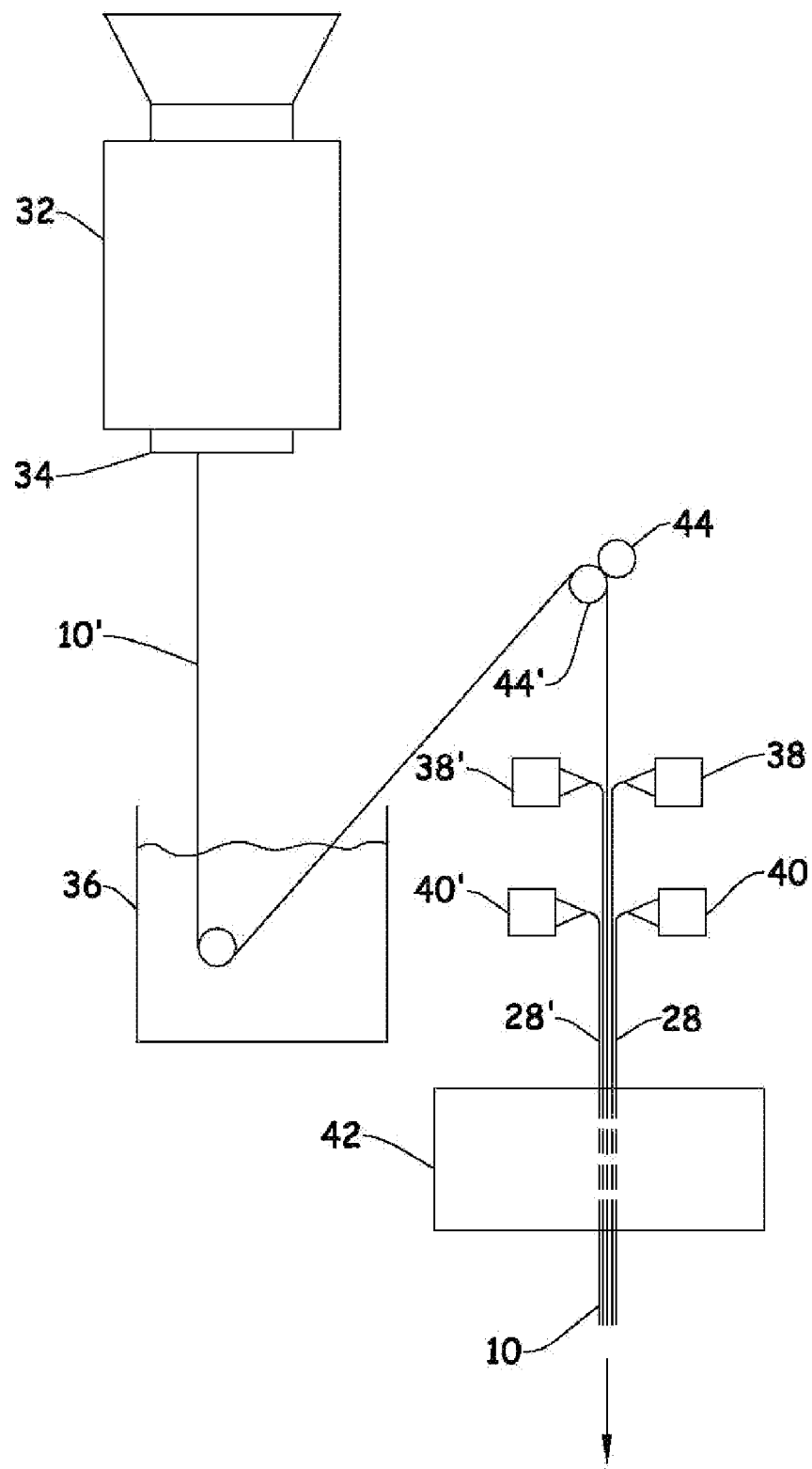
FIG. 3 is a schematic view of an idealized manufacturing set-up for producing a continuous dual-sided membrane sheet.

The present invention includes a dual-sided membrane sheet as generally shown at 10 in FIG. 1. The sheet (10) includes two opposing, generally planar, outer surfaces (12, 14) that extend along a length (L) and define the thickness (T) of the sheet. Two opposing edges (16, 18) extend along the length (L) of the sheet (10) and define the width (W) of the sheet. The sheet (10) further includes edge sections (20, 22) that extend inward (i.e. towards each other) from the each opposing edge (16, 18) along the length (L) of the sheet (10) and border a bulk section (24) located therebetween. The edge sections (20, 22) preferably have width of at least 10 mm, but more preferably at least 20 mm and in some embodiments at least 30 mm or even 50 mm. In other embodiments, the edge sections (20, 22) may have widths selected from between about 10 to 50 mm and more preferably about 20 to 40 mm. The thickness of the edge sections (20, 22) is preferably at least 10% greater than the thickness of the bulk section (24). In other embodiments, the thickness of the edge sections (20, 22) is at least 20%, 30% or 40% greater than thickness of the bulk section (24) of the sheet (10).

For many applications the bulk section (24) of the membrane sheet (10) has a relatively uniform average thickness (e.g. thickness various by less than 10% from the average) wherein the average thickness is typically from about 0.1 to 10 mm, but more commonly from about 0.25 to 2.5 mm. For RO and NF applications, the average thickness of the bulk section (24) is preferably less than about 0.6 mm (e.g. about 0.2 to 0.5 mm). The width (W) of the membrane sheet is not particularly limited, but is preferably from about 100 to 1100 mm. The length (L) of the membrane sheet is also not particularly limited and is often determined by the module design used in connection with the sheet.

FIG. 2 illustrates an alternative embodiment of an edge section (22) that includes a ridge structure (30, 30'). While shown as a rounded notch, the ridge structure (30, 30') may also comprise a slot, angular notch or protuberance (not shown). The width, thickness and ridge structure of one edge section need not be the same as the other edge section.

A plurality of capillary channels (26) extend in a direction along the length (L) of the sheet (10) through the bulk section (24), i.e. between the edges (16, 18) and outer surfaces (12, 14). In a preferred embodiment, the capillary channels (26) are "aligned" with each other, i.e. substantially straight, parallel with each other and spaced apart (not crossed or interconnected). As shown, capillary channels (26) are absent from the edge sections (20, 22); however, in some embodiments capillary channels (26) may be present within the edge sections (20, 22). The diameter and shape of the capillary channels are not particularly limited but are preferably elliptical, e.g. circular cross-section. Depending upon the method used to produce the microporous polymer sheet, polygonal shapes, e.g. rectangular, diamond, and hexagonal are also possible. The diameter of the capillary channels is not particularly limited and is often determined by the limits of the manufacturing technique, materials of construction, sheet thickness and pressure requirements dictated by the end use application of the module. For most applications, diameters of from 0.05 to 5 mm are suitable, with diameters of 0.1 to 0.5 being more preferred. Center-to-center spacing of capillary channels is preferably from 0.1 to 5 mm, but more preferably from 0.2 to 1 mm, depending upon the diameter of the capillary channel.

The membrane sheet (i.e. the edge and bulk sections) preferably comprises a microporous polymer structure. In particular, the bulk section (24) comprises a microporous polymer structure that provides selective fluid communication between the opposing outer surfaces (12, 14) and the capillary channels (26). The microporous polymer structure is not particularly limited and the morphology, density, tensile strength, average pore size and porosity are typically a function of the material and manufacturing technique utilized to produce the sheet. In many embodiments the microporous polymer structure is produced by extruding a polymer mixture into a sheet including capillary channels followed by a phase inversion which creates the desired porosity. Other well known techniques such as stretching and the use of porogens may also be used. The size and distribution of pores throughout the microporous polymer structure can be controlled via known techniques. Depending upon the end use application, the average pore sizes (e.g. as measured by ASTM F316-03) may range from 0.001 to 10 μm, but in many applications the average pore size will range from 0.01 to 1 μm. The microporous structure may be isotropic or anisotropic. The porosity (e.g. "specific surface area" as measured by BET, see S. Brunauer, P. H. Emmett and E. Teller. *J. Am. Chem. Soc.* 60 (1938), p. 309) of the microporous polymer structure of the bulk section (24) is preferably at least 50%. In some embodiments, the porosity of the sheet is relatively uniform throughout both the edge sections (20, 22) and bulk section (24); however, in other embodiments the microporous polymer structure of the edge sections has a lower porosity than that of the bulk section (24), (e.g. at least 10%, more preferably at least 20% and in some embodiments at least a 50% lower porosity). Similarly, the density of the microporous polymer structure may be relatively uniform throughout both the edge sections and bulk section of the sheet; however, in other embodiments the microporous polymer structure of the edge sections (20, 22) may have a higher density than the polymer structure of the bulk section (24) (e.g. at least 10%, more preferably at least 20% and in some embodiments at least a 50% higher density). The method for measuring density is not particularly limited but geometric gravimetric methods are preferred, (e.g. ASTM D1622-08, particularly sections 6.1-6.2). Sample sizes used to calculate density are not particularly limited (e.g. 80 mm×15 mm×0.5 mm). At least one and preferably both edge sections (20, 22) have a tensile strength at least twice and more preferably four times as great as the bulk section (24) of the membrane sheet (10). As used herein, "tensile strength" refers to the maximum stress on the stress-strain curve, (e.g. as measured by taking a sample (e.g. 80 mm×15 mm×0.5 mm) with a fixed cross-sectional area and pulling it with a controlled, gradually increasing force).

The subject membrane is preferably "dual-sided." As used herein, the term "dual-sided" means that portions of both outer surfaces (12, 14) are capable of providing fluid separation. For example, in a preferred embodiment a discriminating layer (28, 28') is present upon at least a portion of both outer surfaces (12, 14) of the membrane sheet (10) and serves as a semi-permeable barrier for separating constituents from a feed liquid contacting either (or both) outer surfaces (12, 14) of the membrane sheet (10). While the discriminating layer may cover the entire outer surfaces (12, 14) of the sheet (10), in a preferred embodiment the discriminating layer (28, 28') only covers the bulk section (24) and does not cover the edge sections (20, 22). In one set of preferred embodiments, the discriminating layer (28, 28') serves as a reverse osmosis (RO) or nano-filtration (NF) membrane. In such embodiments the discriminating layer is non-porous or porous with an average pore size of less than about 0.001 μm (e.g. 0.001 to 0.00001 μm). For purposes of this description, RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ions. NF membrane also typically reject particles in the nanometer range as well as organic molecules having molecular weights greater than approximately 200 to 500 Daltons. In other embodiments, the discriminating layer may serve as an ultra-filtration (UF) membrane having an average pore size smaller than that of the microporous polymer structure of the underlying bulk section, e.g. from 0.001 to 0.01 μm. In most embodiments, the discriminating layer is preferably less than about μm 5 thick and more preferably less than about 1 μm thick, (e.g. from about 0.01 micron to 1 micron but more preferably from about 0.01 to 0.1 micron).

In a preferred embodiment, the membrane sheet (10) is "unsupported" i.e. has an "unsupported structure." As used herein, the term "unsupported" or "unsupported structure" means a membrane sheet that excludes a fibrous support material such as a web or scrim of non-woven or woven fabric.

The present invention includes a method for preparing a dual-sided membrane sheet which comprises the steps of: a) forming a microporous sheet and b) forming a semi-permeable discriminating layer. The method includes both batch processes and continuous processes wherein the microporous polymer sheet of step a) is continuously advanced along a production pathway to a separate location wherein a semi-permeable discriminating layer is formed upon at least a portion of the opposing outer surfaces of the sheet. In a preferred embodiment, the sheet advances along a production pathway wherein various process steps are performed upon the moving sheet. The term "production pathway" is intended to describe a path in which the sheet travels during at least a portion of its formation.

FIG. 3 provides a schematic view of a idealized manufacturing set-up showing several manufacturing stages or steps performed at separate locations along a production pathway. The step of forming a microporous sheet is not particularly limited but generally comprises multiple sub-steps including extruding or casting a polymer mixture to form a sheet (10') followed by conducting a phase inversion to form a microporous polymer structure throughout the sheet. The microporous polymer sheet is preferably formed by extruding a polymer mixture (extruder 32) through a die (34) which forms the capillary channels and a configuration of a sheet as generally described with reference to FIGS. 1 and 2. In the illustrated embodiment, the sheet has a length (L) in the direction of extrusion. Once extruded, the sheet preferably undergoes a phase inversion (e.g. diffusion induced phase inversion, temperature induced phase inversion, etc.) to form a microporous polymer structure. The phase inversion is preferably accomplished by advancing the sheet along a production pathway to a separate location, illustrated in FIG. 3 as a phase inversion bath (36) which is spaced apart from the extruder (32). Polymers useful for preparing microporous sheets include: polysulfones, poly(ether sulfones) and poly(vinylidene fluorides). Polymer mixtures typically include a combination of polymers, solvents and porogens. Methods for making such membrane sheets are described in WO1981/02750; U.S. Pat. No. 5,046,936; U.S. Pat. No. 5,089,187; U.S. Pat. No. 5,171,493; U.S. Pat. No. 6,787,216 and US 2009/0011182.

Once formed the resulting microporous polymer sheet advances to a separate location wherein a discriminating layer (28, 28') is applied, e.g. via coating (spray coater, contact coater, meniscus coating, etc.). The discriminating layer may be sequentially applied to each outer surface of the sheet, or simultaneous applied to both outer surfaces as illustrated in FIG. 3, see coaters (38, 38'). For purposes of facilitating illustration, the thickness of the discriminating layer (28, 28') has been exaggerated. The step of applying the discriminating layer may include multiple coating or application steps, e.g. see second set of coaters (40, 40'). Materials useful for forming such discriminating layers are not particularly limited and include: polyamides, polyurea, cellulose acetates and sulfonated polysulfones. One preferred material includes a polyamide formed via an interfacial polycondensation reaction between a polyfunctional amine monomer and a polyfunctional acyl halide monomer, such as by way of sequential coating of the opposing outer surfaces (12, 14) of the membrane sheet with an aqueous solution of amine (e.g. via applicators 38, 38') followed by an organic-based solution of polyfunctional acyl halide monomer (e.g. via applicators 40, 40'). More specifically, the polyamide discriminating membrane layer may be prepared by interfacially polymerizing a polyfunctional amine monomer with a polyfunctional acyl halide, (wherein each term is intended to refer both to the use of a single species or multiple species), on at least a portion of the outer surfaces of the microporous polymer sheet. As used herein, the term "polyamide" refers to a polymer in which amide linkages (—C(O)NH—) occur along the molecular chain. The polyfunctional amine monomer and polyfunctional acyl halide are most commonly delivered to the microporous sheet by way of a coating step from solution, where the polyfunctional amine monomer is typically coated from an aqueous-based solution and the polyfunctional acyl halide from an organic-based solution. Although the coating steps need not follow a specific order, the polyfunctional amine monomer is preferably coated on the microporous sheet first followed by the polyfunctional acyl halide. Coating can be accomplished by spraying, film coating, rolling, or through the use of a dip tank among other coating techniques. Excess solution may be removed from the support by air knife, dryers, ovens and the like. The polyfunctional amine monomer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. The polyfunctional amine monomer may be applied to the microporous sheet as an aqueous-based solution. The aqueous solution may contain from about 0.1 to about 20 weight percent and more preferably from about 0.5 to about 6 weight percent polyfunctional amine monomer. Once coated on the microporous sheet, excess aqueous solution may be optionally removed.

The polyfunctional acyl halide is preferably coated from an organic-based solution including a non-polar solvent. Alternatively, the polyfunctional acyl halide may be delivered from a vapor phase (e.g., for polyfunctional acyl halide species having sufficient vapor pressure). The polyfunctional acyl halide is preferably aromatic and contains at least two and preferably three acyl halide groups per molecule. Because of their lower cost and greater availability, chlorides are generally preferred over other halides such as bromides or iodides. One preferred polyfunctional acyl halide is trimesoyl chloride (TMC). The polyfunctional acyl halide may be dissolved in a non-polar solvent in a range from about 0.01 to 10 weight percent, preferably 0.05 to 3 weight percent, and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred non-polar solvent is ISOPAR™ available from Exxon Chemical Company. The organic-based solution may also include small quantities of other materials.

Once brought into contact with one another, the polyfunctional acyl halide and the polyfunctional amine monomer react at their surface interface to form a polyamide discriminating layer or film. This layer, often referred to as a polyamide "thin film layer," provides the membrane sheet with its principal means for separating solute (e.g. salts) from solvent (e.g. aqueous feed stream). Due to its relative thinness, the discriminating layer is often described in terms of its coating coverage or loading upon the microporous polymer sheet, e.g. from about 2 to 5000 mg of polyamide per square meter surface area of microporous sheet and more preferably from about 50 to 500 mg/m$^2$.

Figure 4:
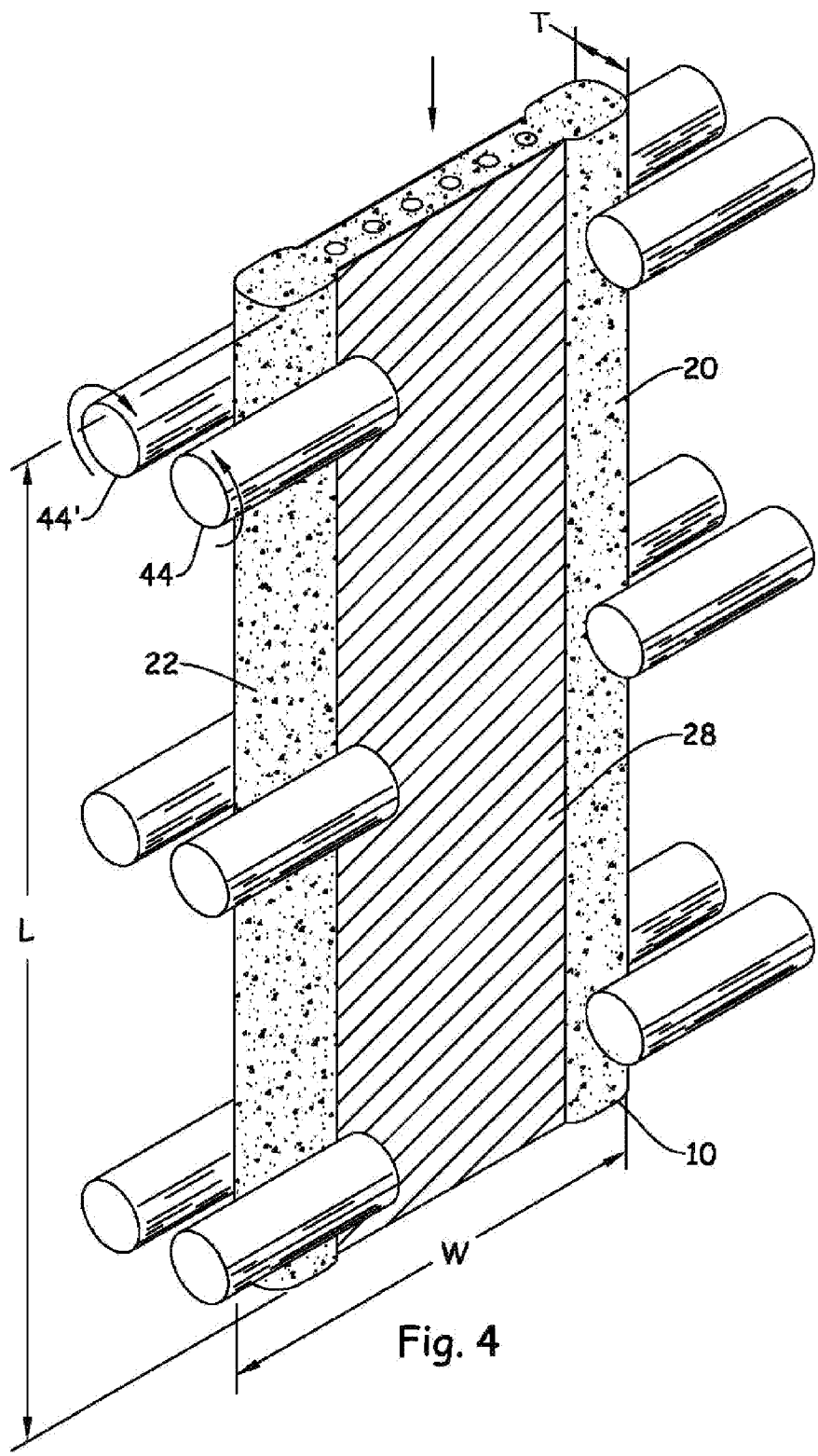
FIG. 4 is a partially cut-away, idealized perspective view of an embodiment for advancing a dual-sided membrane sheet.

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess water or organic solvent can be achieved by drying at elevated temperatures, e.g. from about 40° C. to about 120° C., although air drying at ambient temperatures may be used. These post-coating steps are symbolized at (42) in FIG. 3. The formation of thin film polyamide discriminating layers is generally described in 4277344 to Cadotte and U.S. Pat. No. 6,878,278 to Mickols With reference to FIG. 4, the membrane sheet (10) is preferably advanced along the production pathway (symbolized by a downward arrow) during at least one of the steps of: a) forming a microporous polymer sheet, b) the formation of the discriminating layer, or while transferring the sheet from step a) to step b), by engaging the sheet along one or both edge sections (20, 22). It will be appreciated that steps a) and b) may each comprise several sub-steps and that the engagement of the sheet along one or both edge sections (20, 22) may occur at any step or sub-step. In a preferred embodiment, the sheet is engaged along both edge sections and at no other location along the sheet (i.e. engagement solely upon the edge sections of the sheet), at least until the discriminating layers (28, 28') are formed.

The step of engaging the sheet preferably comprises applying a compressive force to the edge sections of the sheet, such as by way of a releasable clamping device, vacuum gripping device, belt, roller or similar means. In the illustrated embodiment, the outer surfaces of edge sections are engaged by a set or multiple sets of opposing rollers (44, 44'). In an alternative embodiment, the edge section of the sheet may be engaged on one surface (as illustrated in FIG. 3 as the sheet passes through the inversion bath (36). In yet another alternative embodiment, a fixed guide or roller may engage the edge sections at or upon a ridge structure (30) as shown in FIG. 2. When utilized at both edge sections, engagement with a ridge structure allows for the sheet to be drawn taught along its width.

Figure 5:
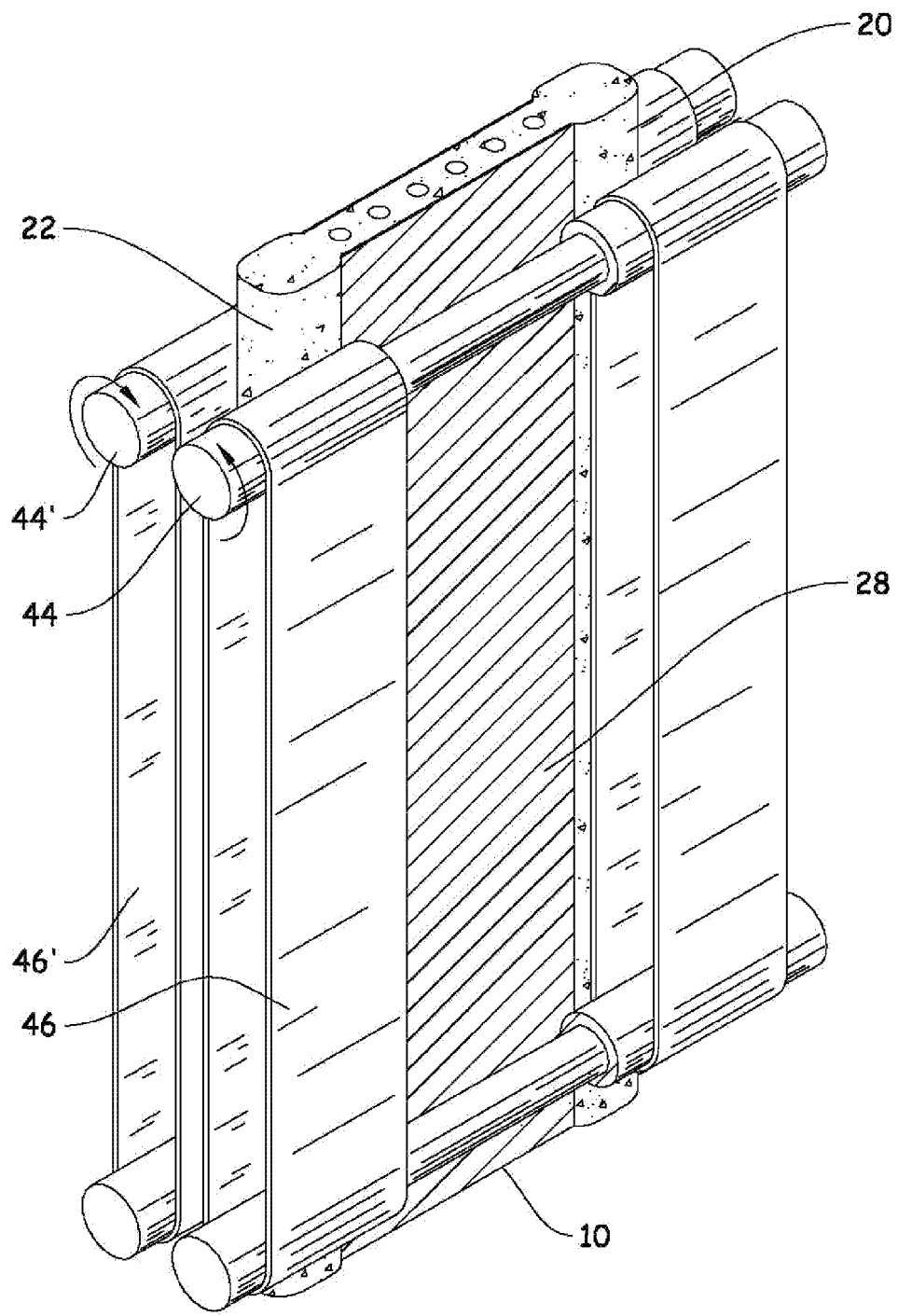
FIG. 5 is a partially cut-away, idealized perspective view of another embodiment for advancing a dual-sided membrane sheet.

As shown in FIG. 5, the sheet (10) may be advanced through the production pathway by a driven (e.g. motorized) roller or belt (46, 46'). In an alternative embodiment not shown, the sheet may be advanced by way of a clamping device which engages the edge sections and is attached to a moving belt, chain or similar means for moving the sheet.

Many embodiments of the invention have been described and in some instances certain embodiments, selections, ranges, constituents, or other features have been characterized as being "preferred." Characterizations of "preferred" features should in no way be interpreted as designated such features as being required, essential or critical to the invention. It will be understood that certain features and sub-combinations are of utility and may be employed without reference to other features and sub-combinations. References to ranges of numerical values expressly include the end points of such ranges.

The entire subject matter of each U.S. patent reference mentioned herein is incorporated by reference.

What is claimed is:

1. A method of preparing a dual-sided membrane sheet comprising the steps of:
   a) forming a microporous polymer sheet having a length, width and thickness and wherein the sheet comprises:
   two opposing outer surfaces extending along the length of the sheet and defining the thickness of the sheet,
   two opposing edges extending along the length of the sheet and defining the width of the sheet,
   an edge section extending inward from each edge along the length of the sheet wherein the edge sections border a bulk section located therebetween, and wherein the thickness of edge sections is at least 10% greater than the thickness of the bulk section, and
   a plurality of capillary channels extending in a direction along the length and through the bulk section of the sheet; and
   b) forming a semi-permeable discriminating layer upon at least a portion of the opposing outer surfaces of the sheet; and
   wherein the sheet is advanced along a production pathway during at least a portion of: step a), step b), or while transferring the sheet from step a) to step b) by engaging the sheet along one or more of the edge sections.

2. The method of claim 1 characterized by comprising a continuous process wherein the microporous polymer sheet of step a) is continuously advanced along a production pathway to a separate location wherein a semi-permeable discriminating layer is formed upon at least a portion of the opposing outer surfaces of the sheet, and wherein the sheet is advanced through the continuous process by engaging the sheet along one or more of the edge sections.

3. The method of claim 1 wherein the step of engaging the sheet comprises applying a compressive force to the edge sections of the sheet.

4. The method of claim 1 wherein the step of engaging the sheet comprises contacting at least one edge section of the membrane sheet with a roller.

5. The method of claim 1 wherein the step of engaging the sheet comprises contacting both edge sections of the membrane sheet between a set of opposing rollers.

6. The method of claim 1 wherein the step of engaging the sheet comprises compressing the edge sections of the sheet within a releasable clamping device.

7. The method of claim 1 wherein each edge section extends inward from the edge at least 10 mm.

8. The method of claim 1 wherein the edge section of the membrane sheet includes a ridge structure.

9. The method of claim 1 wherein capillary channels are absent from the edge sections of the membrane sheet.

10. The method of claim 1 wherein the membrane sheet comprises a microporous polymer structure, wherein the microporous polymer structure of the edge sections has a lower porosity than the microporous polymer structure of the bulk section.

11. The method of claim 1 wherein the membrane sheet comprises a microporous polymer structure, wherein the microporous polymer structure of the edge sections has a higher density than the microporous polymer structure of the bulk section.

12. The method of claim 1 wherein the step of forming a microporous polymer sheet comprises:
   i) extruding a polymer mixture to form a sheet have a length extending in the direction of extrusion, and
   ii) forming a microporous polymer structure throughout the extruded sheet by conducting a phase inversion.

13. The method of claim 1 wherein the step of forming a semi-permeable discriminating layer comprises coating one or more materials upon each outer surface to form a semi-permeable discriminating layer.

14. The method of claim 1 wherein the step of forming a semi-permeable discriminating layer comprises coating a polyfunctional amine and a polyfunctional acyl halide upon each outer surface of the sheet to form a crosslinked polyamide layer thereon.

15. The method of claim 1 wherein the membrane sheet comprises an unsupported structure.

* * * * *